(12) United States Patent
Ogrinz et al.

(10) Patent No.: US 11,556,868 B2
(45) Date of Patent: Jan. 17, 2023

(54) SYSTEM FOR AUTOMATED AND INTELLIGENT ANALYSIS OF DATA KEYS ASSOCIATED WITH AN INFORMATION SOURCE

(71) Applicant: BANK OF AMERICA CORPORATION, Charlotte, NC (US)

(72) Inventors: Michael Ogrinz, Easton, CT (US); Jasmine Quintana, Charlotte, NC (US); Candhadai Ramaswamy Varadharajan, Irving, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 122 days.

(21) Appl. No.: 16/898,034

(22) Filed: Jun. 10, 2020

(65) Prior Publication Data
US 2021/0390467 A1 Dec. 16, 2021

(51) Int. Cl.
*G06Q 10/00* (2012.01)
*G06Q 10/06* (2012.01)
*G06F 16/28* (2019.01)
*G06F 16/2457* (2019.01)

(52) U.S. Cl.
CPC ... *G06Q 10/0631* (2013.01); *G06F 16/24578* (2019.01); *G06F 16/285* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 7,401,087 B2 | 7/2008 | Copperman et al. |
| 7,523,082 B2 | 4/2009 | Mohan |
| 7,801,896 B2 | 9/2010 | Szabo |
| 7,991,764 B2 | 8/2011 | Rathod |
| 8,392,335 B2 | 3/2013 | Waingold |
| 8,775,195 B2 | 7/2014 | Stiles et al. |
| 8,886,797 B2 | 11/2014 | Gannu et al. |
| 8,966,398 B2 | 2/2015 | Wright et al. |
| 9,110,950 B2 | 8/2015 | Barsoba et al. |
| 9,262,183 B2 | 2/2016 | Liensberger et al. |
| 9,262,468 B1 | 2/2016 | Brown |
| 9,300,606 B2 | 3/2016 | Bank et al. |

(Continued)

OTHER PUBLICATIONS

Muhammad, Fahad, Heat Maps 101: The Advertiser's Guide to Conversions, Jan. 17, 2019, Instapage, https://instapage.com/blog/heat-map, p. 1-33. (Year: 2019).*

*Primary Examiner* — Joseph M Waesco
(74) *Attorney, Agent, or Firm* — Moore & Van Allen PLLC; Nicholas C. Russell

(57) ABSTRACT

Embodiments of the present invention provide systems and methods for automated and intelligent analysis of information. The system receives interaction data, interaction metadata, and external information in order to identify parties of interactions, subjects of interactions, and infer relationships between parties and subjects based on the content, context, frequency, and amount of available interaction data. Weighted score scores are generated and used to rank the inferred relationships and determined relevance between parties and subjects. This data may be stored in a graphical database and later used to response to user data queries to facilitate collaboration.

17 Claims, 7 Drawing Sheets

(56) References Cited

U.S. PATENT DOCUMENTS

| | | |
|---|---|---|
| 9,304,760 B2 | 4/2016 | Hey, Jr. et al. |
| 9,652,224 B2 | 5/2017 | Hey et al. |
| 9,836,455 B2 | 12/2017 | Martens et al. |
| 2010/0169426 A1 | 7/2010 | Dreyfus et al. |
| 2010/0262610 A1 | 10/2010 | Acosta et al. |
| 2014/0164527 A1 | 6/2014 | Bank et al. |
| 2014/0172837 A1* | 6/2014 | Sommer ............... G06F 16/951 709/204 |
| 2015/0339616 A1 | 11/2015 | Pursche et al. |
| 2016/0140186 A1 | 5/2016 | Langen |
| 2016/0314145 A1* | 10/2016 | Peck ................... G06F 16/9535 |
| 2016/0344828 A1* | 11/2016 | Häusler ............... G06F 16/9535 |
| 2017/0344541 A1* | 11/2017 | Haeusler ........... G06F 16/24578 |
| 2017/0371933 A1 | 12/2017 | Polonsky et al. |
| 2018/0091653 A1* | 3/2018 | Miller ............... G06Q 10/06398 |
| 2018/0232367 A1* | 8/2018 | Häusler ............... G06F 16/9535 |
| 2018/0246888 A1* | 8/2018 | Zholudev ................ G06Q 30/02 |
| 2018/0262618 A1* | 9/2018 | Stern ................... H04M 3/5175 |
| 2019/0034424 A1* | 1/2019 | Alvares ................. H04L 67/535 |
| 2019/0099653 A1* | 4/2019 | Wanke ..................... G07C 1/22 |
| 2020/0026772 A1* | 1/2020 | Wheeler ............... G06F 16/248 |
| 2020/0044991 A1* | 2/2020 | Fritsch ................ G06F 16/9535 |
| 2020/0294681 A1* | 9/2020 | Routray ............ G06F 16/24578 |
| 2021/0201327 A1* | 7/2021 | Konig ................. G06Q 30/016 |
| 2021/0203735 A1* | 7/2021 | Sommer ........... G06F 16/90335 |
| 2021/0279295 A1* | 9/2021 | Koneru ................ G06F 16/972 |
| 2021/0374671 A1* | 12/2021 | Li ........................ G06N 3/0445 |

\* cited by examiner

*FIGURE 5*

Search for: User

Name

Name: Last, First
Title: Title 1
Email: Last.First@example.com

SEARCH

501

Search for: Entity

Entity 1

Name: Entity 1
Domain: example.com

SEARCH

502

SYSTEM FOR AUTOMATED AND INTELLIGENT ANALYSIS OF DATA KEYS ASSOCIATED WITH AN INFORMATION SOURCE

FIELD OF THE INVENTION

The present invention is generally related to systems and methods for intelligent analysis of data in order to determine relevance of one or more parties with regard to specified subject matter.

BACKGROUND

The act of using electronic devices for communication, coordination and storage of data records is becoming an increasingly prevalent and pervasive, particularly in the context of large entities with many remote users or employees. While electronic communication and coordination clearly offers benefits in terms of task collaboration, there is an opportunity to further utilize and leverage such information to determine and convey useful relationships for future collaboration. As such, there is a need for an intelligent system for analyzing electronic information in order to identify and provide increased access to collaborative opportunities and potential contacts.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address present needs by providing a system for verification of data records via multi-channel inputs that is configured for intelligent, proactive and responsive communication with a user via a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel and store unique user patterns to form an authentication baseline for subsequent user communications. The system is further configured to switch between the various communication channels seamlessly, and in real-time. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for establishing a system for generation of verified data records, the system comprising: at least one memory device with computer-readable program code stored thereon; at least one communication device; at least one processing device operatively coupled to the at least one memory device and the at least one communication device, wherein executing the computer-readable program code is configured to cause the at least one processing device to: receive interaction data and interaction metadata from one or more user devices or one or more third party systems; analyze the interaction data and interaction metadata and determine one or more subjects of interaction and one or more parties of interaction; generate a weighted score for the one or more parties of interaction or for the one or more parties of interaction and the one or more subjects of interaction based on analyzing the interaction data and interaction metadata; and store the one or more identified subjects of interaction and one or more parties of interaction in a database, wherein the one or more subjects of interaction and one or more parties of interaction are arranged based on the weighted score.

In some embodiments, the system is further configured to: receive a user query from the one or more user devices, wherein the user query comprises a specified subject; perform a check of the database to determine one or more parties of interaction associated with the specified subject, wherein association is determined based on the weighted score; compile a list of relevant parties of interaction as relevant party information; and transmit the list of relevant party information to the user in response to the user query as data formatted to display on the one or more user devices.

In some embodiments, the interaction data comprises one or more communications between multiple of the interaction parties.

In some embodiments, the interaction metadata comprises one or more application logs, distribution groups, organizational hierarchy charts, contracts, or governance policies.

In some embodiments, the relevance of interaction metadata may be determined based on a frequency, amount, timeframe, source, or resource value of an existing business relationship between one or more users or organizations.

In some embodiments, the system is further configured to: gather public third party information for the one or more subjects of interaction or one or more parties of interaction; and integrate the public third party information as contextual information to support or refute the weighted score.

In some embodiments, the weighted score is a percentile rank for the one or more interaction parties with regard to association with the one or more interaction subjects as compared within a single organization.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
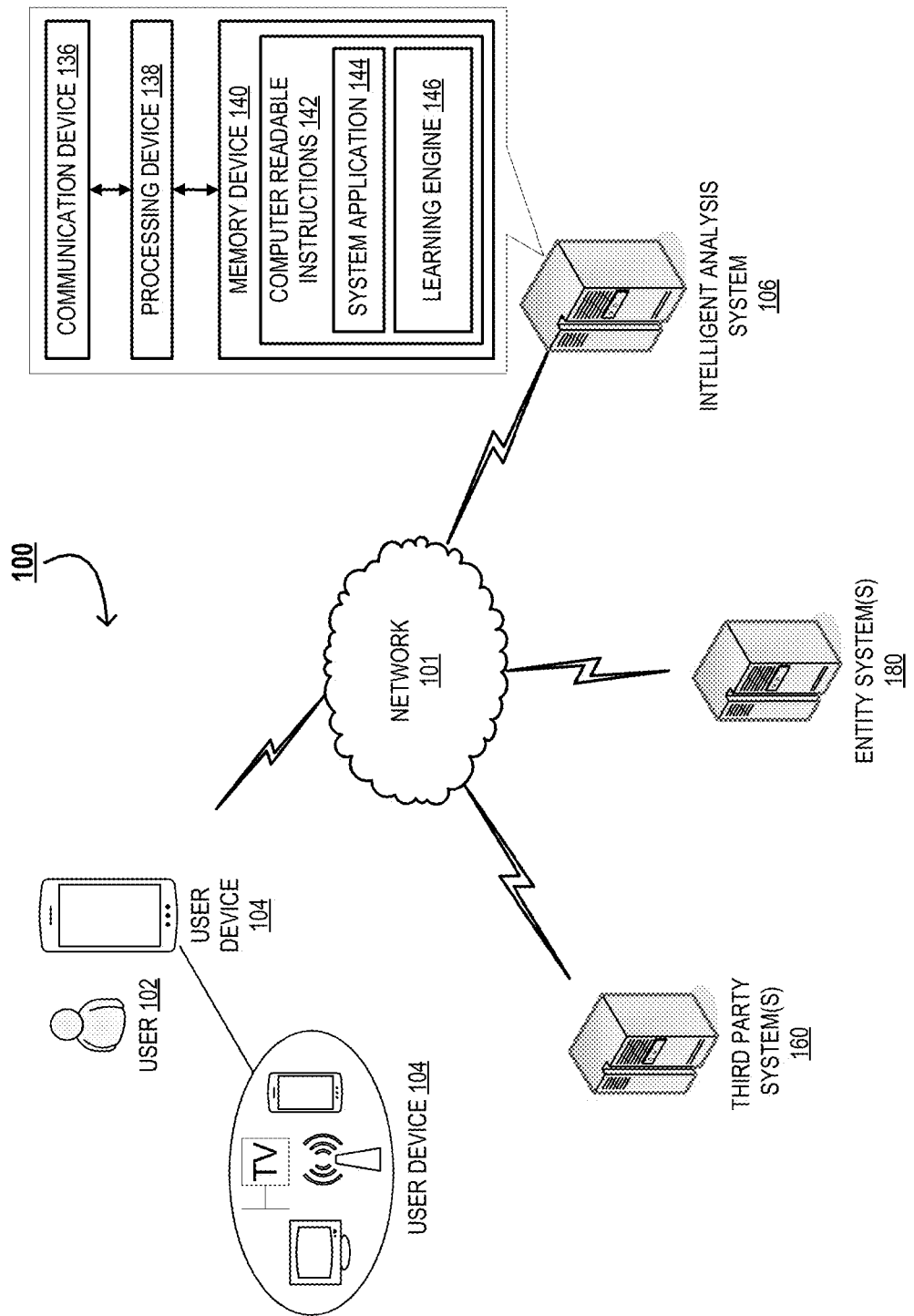
Figure 2:
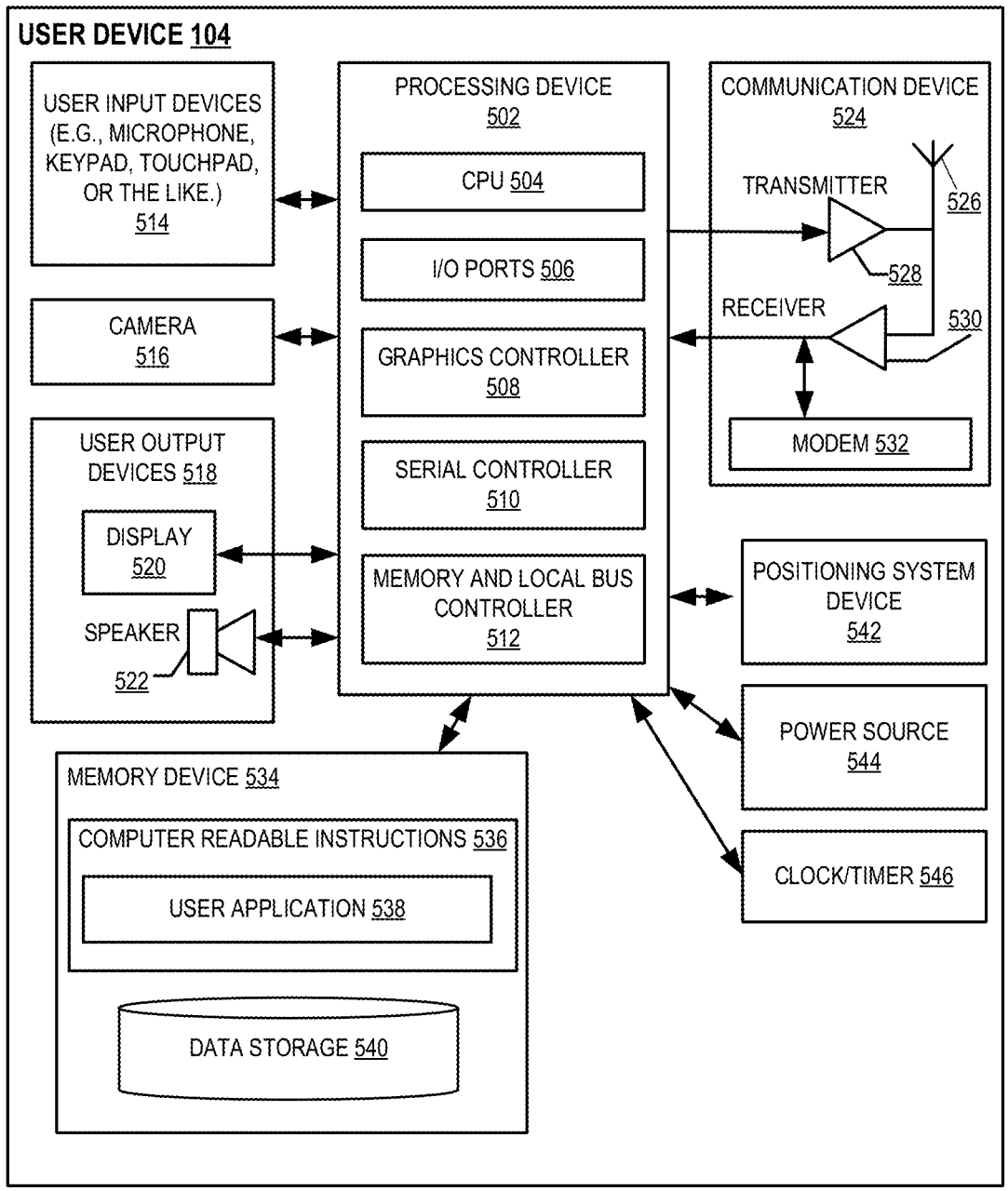
Figure 3:
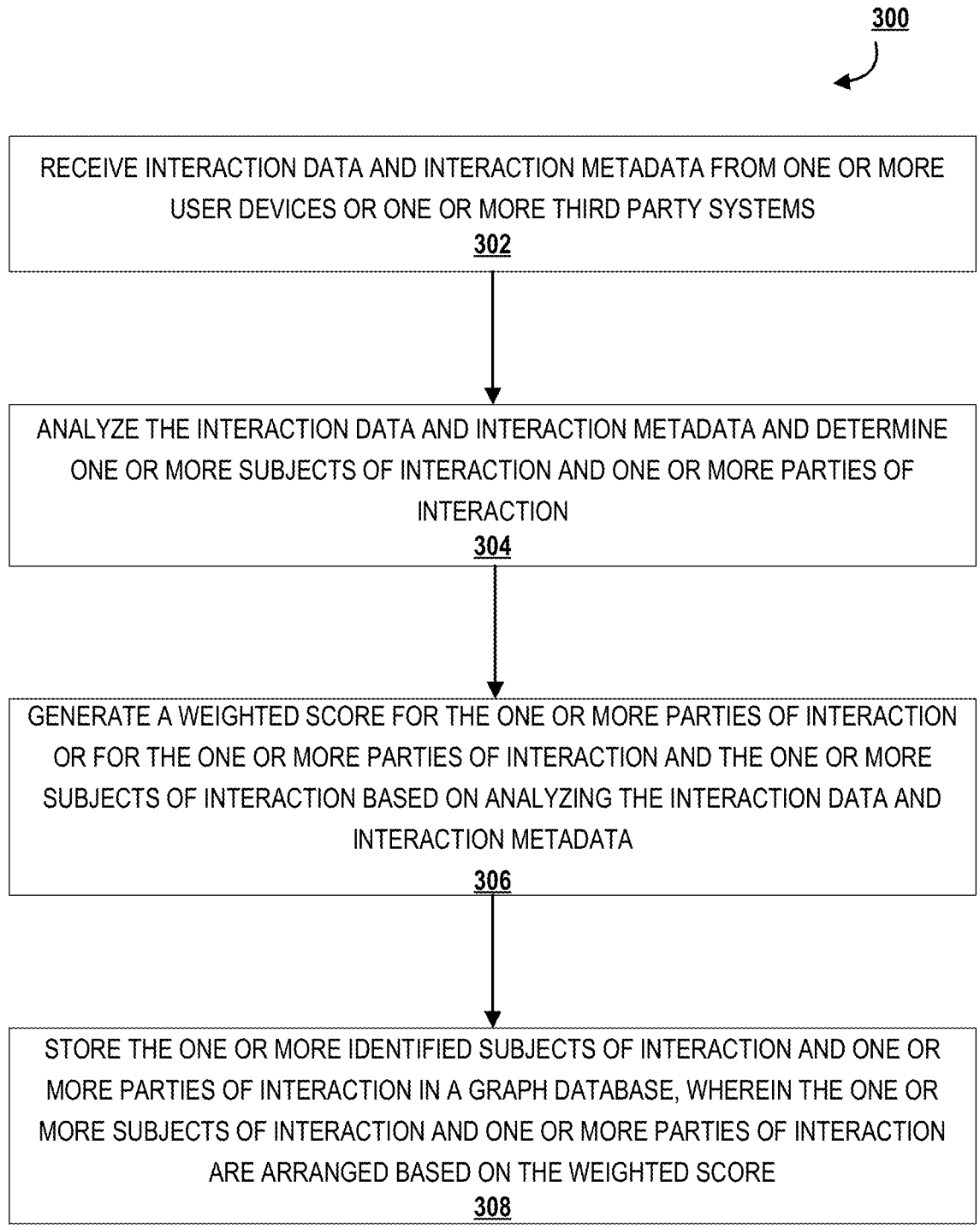
Figure 4:
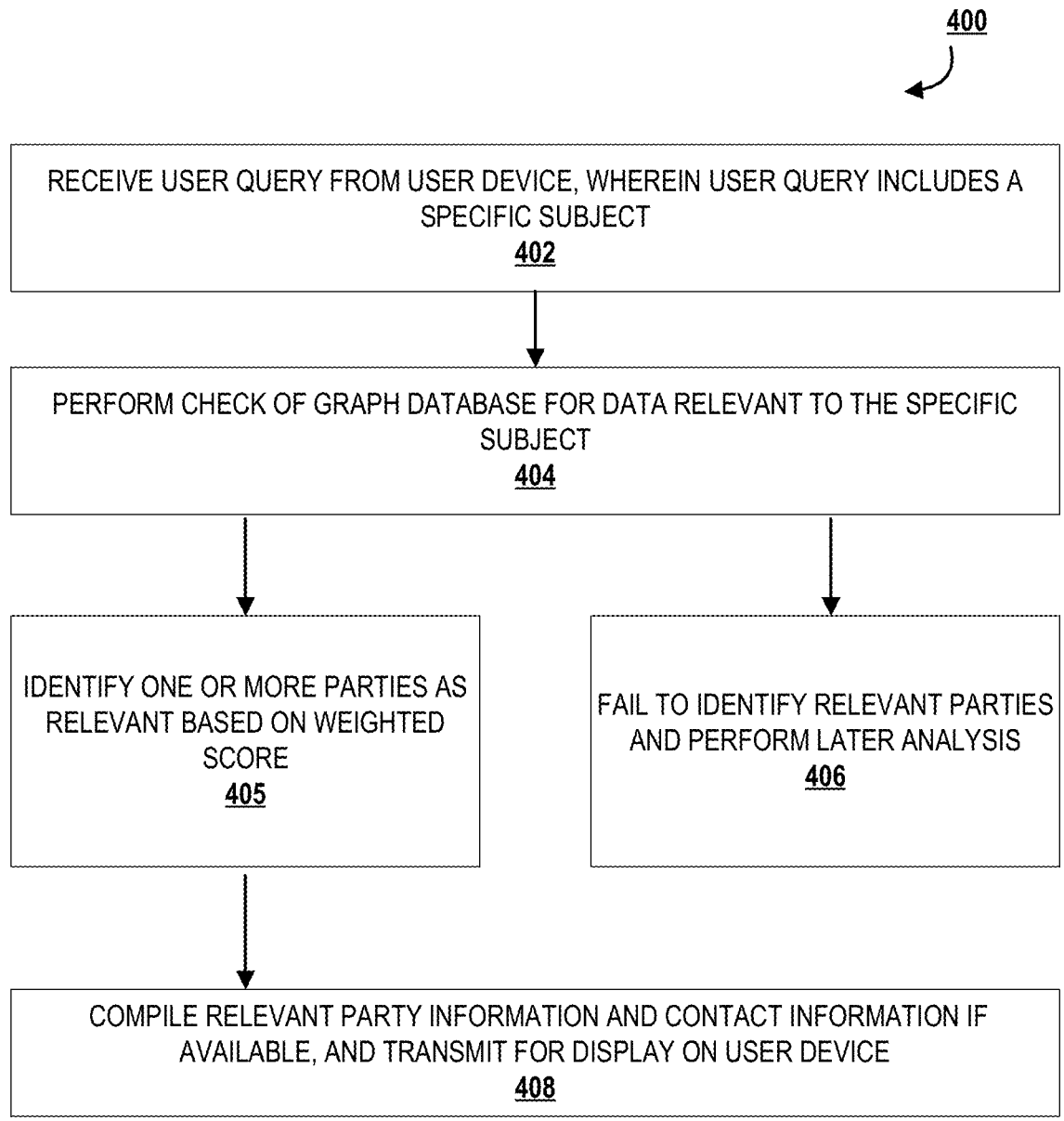
Figure 6:
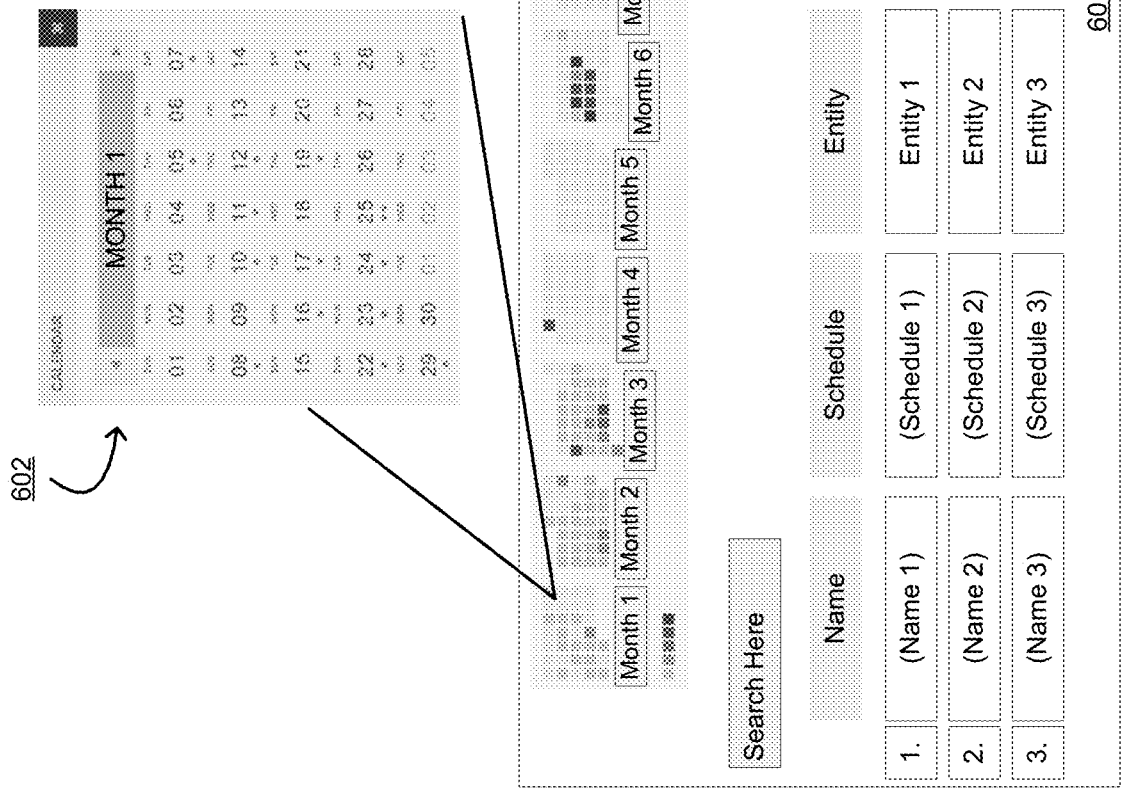
Figure 7:
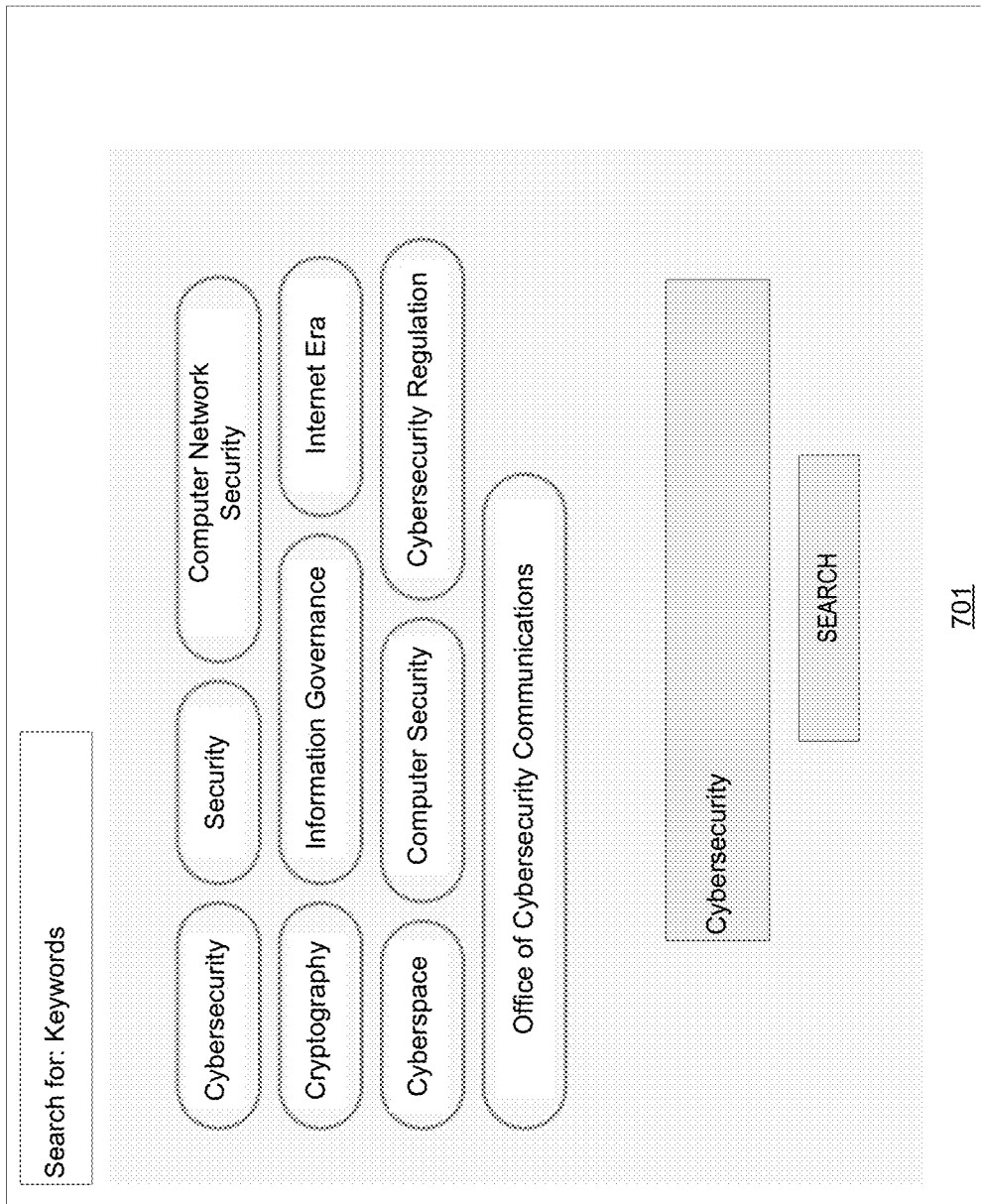

Having thus described embodiments of the invention in general terms, reference will now be made to the accompanying drawings, wherein:

FIG. 1 depicts a system environment 100 providing a system for analysis of information, in accordance with one embodiment of the present invention;

FIG. 2 provides a block diagram of the user device 104, in accordance with one embodiment of the present invention;

FIG. 3 depicts a high level process flow 300 of subject matter identification and relationship extrapolation, in accordance with embodiments of the present invention;

FIG. 4 illustrates a high-level process flow 400 for user information query, in accordance with embodiments of the present invention;

FIG. 5 illustrates multiple user interface embodiments for multi-modal information query, in accordance with embodiments of the present invention;

FIG. 6 illustrates a user interface for information query results and heat map indication, in accordance with embodiments of the present invention; and FIG. 7 illustrates an embodiments for keyword information query, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like. As used herein, a "third party" or "third party system" may be an entity that does not manage the intelligent analysis system, but provides data to or receives data from the intelligent analysis system or entity system that controls the intelligent analysis system. It is understood that one or more third party systems and entities are contemplated as communicating with the intelligent analysis system over a network.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution or the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably.

An "account" may be established by the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user configuration that includes personal information associated with the user, or the like. The account may typically be associated with and/or maintained by an entity, or associated with technology infrastructure such that the account or resources stored in the account may be accessed, modified or acted upon by the user electronically, for example using or transaction terminals, user devices, merchant systems, or the like. In some embodiments, the entity may provide one or more technology instruments or financial instruments to the user for executing resource transfer activities or financial transactions.

As used herein, a "user interface" may be a graphical user interface that facilitates communication using one or more communication mediums such as tactile communication (such, as communication via a touch screen, keyboard, or the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems or the like.

An electronic activity, also referred to as a "technology activity," "interaction," "engagement," or a "user activity", may refer to any activities or communication between multiple users or entities, between the user and the entity, communication between technology applications or the like. A "relationship" may refer to a link identified by the system or inferred by the system as existing between multiple users, multiple entities, between users and entities, and may be based on interactions, user data, entity data, third party data, metadata, or the like.

In accordance with embodiments of the invention, the term "user" may refer to an individual or the like, who utilizes an external apparatus such as a user device, for retrieving information related to the user's communications, calendar, applications, or the like that the entity or third party may maintain. Such information related to the user's business may be related to resource transfers or transactions that other users have completed using the entity systems. Such information related to the user's schedule may be related to various meetings, phone calls, engagements, or the like. The external apparatus may be a user device (computing devices, mobile devices, smartphones, wearable devices, or the like). In some embodiments, the user may seek to perform one or more user activities using a user application stored on a user device or accessed via a web portal, application programming interface (API), or the like. In some embodiments, the user may perform a query by initiating a request for information from the entity using the user device to interface with the system.

FIG. 1 depicts a system environment 100 providing a system for analysis of information, in accordance with one embodiment of the present invention. As illustrated in FIG. 1, an intelligent analysis system 106, configured for providing an intelligent, proactive and responsive application or system, at a user device 104, which facilitates analysis of interactions and metadata. The intelligent analysis system is operatively coupled, via a network 101 to one or more user devices 104, to entity systems 180, third party systems 160, and other external systems/third-party servers not illustrated herein. In this way, the intelligent analysis system 106 can send information to and receive information from multiple user devices 104 and entity devices to provide an integrated platform with multi-channel data analysis capabilities to a user 102, and particularly to the user device 104. At least a portion of the system may be configured to reside on the user device 104 (for example, at a user application), on the intelligent analysis system 106 (for example, at the system application 144), and/or on other devices and system. Furthermore, the system is capable of seamlessly adapting to and switch between channels of communication or communication modes (such as speech or audio communication, textual communication in the user's preferred natural language, gestures or the like), and may be infinitely customizable by the system 106 and/or the user 102 to receive and analyze data in any natural language or coding language.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between devices, for example establishing a communication channel, automatically and in real time, between the one or more user devices 104. Therefore, the system, via the network 101 may establish, operative connections between devices. In this regard, the network 101 may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion a separate user device 104 or it may include only waving or holding the external apparatus near an appropriate portion of another user device without making physical contact. In other embodiments, the network 101 may establish communications between one or more of the user device 104, third party system(s) 160, entity system (s) 180, and intelligent analysis system 106. In this way, the various systems and devices may share data which the intelligent analysis system 106 may use for later analysis. In some embodiments, the capabilities of the intelligent analysis system 106 may be provided as a service (e.g., software as a service, or "SAAS") to one or more of the user device 104, third party system(s) 160, or entity system(s) 180. For instance, as user 102 may utilize a device, application, or system to interface with the intelligent analysis system 106 in order to obtain helpful or relevant information.

In some embodiments, the user 102 is an individual that wishes to request or submit data from the intelligent analysis system 106 using the user device 104. In some embodiments, the user 102 may access the intelligent analysis system 106, and/or the entity system 180 through a user interface comprising a webpage or a user application. Hereinafter, "user application" is used to refer to an application on the user device 104 of the user 102, a widget, a webpage accessed through a browser, or the like. As such, in some instances, the user device may have multiple user applications stored/installed on the user device 104 and the memory device in particular. In some embodiments, the user application is a user application, provided by and stored on the user device 104 by the intelligent analysis system 106. In some embodiments the user application may refer to a third party application or a user application stored on a cloud used to access the intelligent analysis system 106 through the network 101, or the like. In some embodiments, the user application is stored on the memory device 140 of the intelligent analysis system 106, and the user interface is presented on a display device of the user device 104, while in other embodiments, the user application is stored on the user device 104.

The user 102 may subsequently navigate through the interface or initiate one or more requests for information using a central user interface provided by the user application of the user device 104. In some embodiments, the user 102 may be routed to a particular destination or location using the user device 104. In some embodiments an auxiliary user device requests and/or receives additional information from the intelligent analysis system 106 and/or the user device 104 for authenticating the user and/or the user device, determining appropriate queues, executing information queries, and other functions. In other embodiments, the user application may interface with one or more separate applications stored on the user device 104 such that it can receive and send data between applications in order to provide the user 102 with relevant information. For instance, the user 102 may utilize a web browsing application on the user device 104 to open a webpage in the user application (e.g., the user submits a query through a web portal and in turn is directed by the intelligent analysis system 106 to certain contact information stored in an a user application, or the like).

FIG. 1 also illustrates the user device 104. The user device 104, herein referring to one or more user devices, wherein each device may generally comprise a communication device, a display device, a positioning device, a processing device, and a memory device. Typically, the user device 104 is a computing system that allows a user 102 to interact with other systems to initiate information queries, or the like.

As further illustrated in FIG. 1, the intelligent analysis system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, the user device 104, or the like. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the intelligent analysis system 106 comprises computer-readable instructions 142 or computer readable program code 142 stored in the memory device 140, which in one embodiment includes the computer-readable instructions 142 of a system application 144. The computer readable instructions 142, when executed by the processing device 138 are configured to cause the system 106/processing device 138 to perform one or more steps described in this disclosure to cause out systems/devices (such as the user device 104, the user application 122, or the like) to perform one or more steps described herein. Intelligent analysis system 106 also includes learning engine 146. In some embodiments, the learning engine 146 is used to analyze received data in order to identify complex patterns and intelligently improve the efficiency and capability of the intelligent analysis system 106 to analyze received data and identify patterns or relationships. In some embodiments, the learning engine 146 may include supervised learning techniques, unsupervised learning techniques, or a combination of multiple machine learning models that combine supervised and unsupervised learning techniques. In some embodiments, the learning engine 146 may include an adversarial neural network that uses a process of encoding and decoding in order to adversarial train one or more machine learning models to identify relevant patterns in received data received from one or more channels of communication.

In the embodiment illustrated in FIG. 1, and described throughout much of this specification, a "system" configured for performing one or more steps described herein refers to the user application, that may perform one or more user activities either alone or in conjunction with the intelligent analysis system 106, and specifically, the system application 144, one or more auxiliary user devices, third party systems 160, entity systems 180, or the like.

The system and the user application in particular, are configured to function as an intelligent personal assistant and data navigator and are configured to provide data in response to user queries. In particular, the system may be configured to present an integrated central user interface for communicating with the user via natural language or conversation channels, for requesting and transmitting authentication information, and for integrating the functionality of multiple applications in a single interface without requiring the user to access the multiple applications individually and be proficient in their operation. In addition, the system may store identification and authentication information for future use to expedite the completion of subsequent activities. In some instances, after initial authorization or authentication of a user during an initial activity, the system may authenticate the user by using alternate authentication techniques during the completion of subsequent activities.

As such, the user application is configured to perform one or more user activities in a convenient manner, via a central user interface of the application. In this regard, in some embodiments, the central user interface is presented on one or more user devices via the user application. The central user interface associated with the user application may be presented on the display device of the user device 104 in response to receiving an indication from the user (for example, receiving a voice command from the user with an identifier, receiving a tactile indication or a fingerprint authentication from the user device 104, facial recognition information from the user device 104, and other authentication credentials, or the like), automatically in response to detecting an action trigger (for example, determining that the user is attempting to perform an activity by using a particular application or additional device, such as auxiliary user device, or the like). Additionally, the user application may be configured to proactively alert the user of information analyzed and compiled by the intelligent analysis system 106 and entity systems 180. This information may include information related to other users that interact with the intelligent analysis system 106 if information is identified as being relevant and potentially useful to the user 102.

Typically, the central user interface is a computer human interface, and provided by the intelligent analysis system 106 to the user 102 via the user device 104. The various user devices receive and transmit user input to the entity systems 180 and intelligent analysis system 106. The user device 104 may also be used for presenting information regarding user activities, providing output to the user 102, and otherwise communicating with the user 102 via suitable communication mediums such as audio, textual, or the like. The natural language of the user comprises linguistic variables such as words, phrases and clauses that are associated with the natural language of the user 102. The system is configured to receive, recognize and interpret these linguistic variables of the user input and perform user activities and resource activities accordingly. In this regard, the system is configured for natural language processing and computational linguistics. In many instances, the system is intuitive, and is configured to anticipate user requirements, data required for a particular activity or the like, and request data from the user 102 accordingly.

Also pictured in FIG. 1 are one or more third party systems 160, which are operatively connected to the intelligent analysis system 106 via network 101 in order to transmit data associated with user activities, user authentication, user verification, resource actions, or the like. For instance, the capabilities of the intelligent analysis system 106 may be leveraged in some embodiments by third party systems in order to identify user relationships based on data provided by the third party systems 160, third party applications running on the user device 104, or the like as analyzed and compared to data stored by the intelligent analysis system 106, such as data stored at entity systems 180. In some embodiments, the multi-channel data processing (e.g., data processing of information from multiple communication channels or application, such as email applications, scheduling applications, web browsing applications, various social media applications, or the like), capabilities may be provided as a service by the intelligent analysis system 106 to the entity systems 180, third party systems 160, or additional systems and servers not pictured, through the use of an application programming interface ("API") designed to simplify the communication protocol for clientside requests for data or services from the intelligent analysis system 106. In this way, the capabilities offered by the present invention may be leveraged by multiple parties other than the those controlling the intelligent analysis system 106 or entity systems 180.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, or the like), a communication device or network interface device 524, a power source 544, a clock or other timer 546, a visual capture device such as a camera 516, a positioning system device 542, such as a geo-positioning system device like a GPS device, an accelerometer, or the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application 122. The multi-channel resource application 122 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a user application 538. In some embodiments, the user application 538 allows a user 102 to access and/or interact with other systems such as the entity system 180, third party system 160, or intelligent analysis system 106. In one embodiment, the user 102 is a maintaining entity of an intelligent analysis system 106, wherein the user application enables the user 102 to define policies and reconfigure the intelligent analysis system 106 or its components. In one embodiment, the user 102 is a customer of a financial entity and the user application 538 is an online banking application providing access to the entity system 180 wherein the user may interact with a resource account via a user interface of the multi-user application 538, wherein the user interactions may be provided in a data stream as an input via multiple channels. In some embodiments, the user 102 may a customer of third party system 160 that requires the use or capabilities of the intelligent analysis system 106 for authorization or verification purposes.

The processing device 502 may be configured to use the communication device 524 to communicate with one or more other devices on a network 101 such as, but not limited to the entity system 180 and the intelligent analysis system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network or the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance, audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, it is understood that the system further includes one or more entity systems 180 which is connected to the user device 104 and the intelligent analysis system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device. The entity system 180 comprises computer-readable instructions stored in the memory device, which in one embodiment includes the computer-readable instructions of an entity application. The entity system 180 may communicate with the user device 104 and the intelligent analysis system 106 to provide access to user accounts stored and maintained on the entity system 180. In some embodiments, the entity system 180 may communicate with the intelligent analysis system 106 during an interaction with a user 102 in real-time, wherein user interactions may be monitored and processed by the intelligent analysis system 106 in order to analyze interactions with the user 102 and reconfigure the machine learning model in response to changes in a received or monitored data stream. In one embodiment, the system is configured to receive data for decisioning, wherein the received data is processed and analyzed by the machine learning model to determine a conclusion.

FIG. 3 depicts a high level process flow 300 of interaction analysis and relationship extrapolation, in accordance with embodiments of the present invention. As shown, the process begins at block 302 wherein the intelligent analysis system 106 receives interaction data and interaction metadata from one or more user devices or one or more third party systems. As discussed, the system is designed to send data to and receive data from multiple sources and via multiple channels for any source, such as one or more user devices, third party systems, entity systems, or the like. For instance, interaction data or interaction metadata may be transmitted via email, web form submission, calendar application, via a user application on a user device, via text message, via voice data, or the like. In some embodiments, the interaction data may be calendaring data, wherein the calendaring data comprises a scheduled meeting between one or more parties related to a given topic or subject. In some embodiments, a subject may include a person, a company, an industry, an area of practice, or the like. In some embodiments, the interaction data may be email data, wherein the interaction data may include recipient and sender email addresses, subject line, or the like. Interaction data may be enriched with data gathered, inferred from, or received from one or more sources or existing data relationships. For instance, interaction data may be enriched using multiple tiers of data types, one of which may include metadata.

Interaction metadata may include data either inferred about one or more interactions, relationships, users, entities, or the like, or known based on contextual information gathered from other sources, such as one or more entities, third party systems, or knowledge databases. For instance, there may be interaction metadata for particular interaction data that one or more users accepted or declined a certain meeting invitation. In other embodiments, interaction metadata may include other types of data not specifically linked to email and calendaring information alone. Exemplary embodiments may include, but are not limited to, application directory information (e.g., application directory data may indicate the projects or types of projects that a particular user is working on), resource repositories (e.g., a repository of project data may indicate that a user's project is written in a particular coding language, implying expertise in that language), server instance data (e.g., determining a particular user is an admin user for a particular server instance at a particular entity), or inferred relationships between any of these or other data types. For instance, by combining resource repository data and server instance data, the system may determine that the particular user has knowledge of a particular project subject as inferred by the combination of the underlying programing language and the project type itself (e.g., the user codes a particular project in Java language, and is an admin on a Sequel (SQL) server instance, implying that the user has knowledge of Java Database Connectivity (JBDC)).

Furthermore, interaction metadata may be combined with organizational hierarchy data to find related users who may share knowledge of a particular subject, or alternatively infer that those related users may in fact have more knowledge than the originally identified user. For instance, a user with inferred knowledge of a particular subject may have one or more coworkers who are members of an entity working group for a particular subject, while the user with inferred knowledge of that subject is not a member of the working group. In this way, the system is able to accurately source subject matter experts through organizational relationships by using the inferred contextual metadata as an initial indicator to expand its search.

In other embodiments, the interaction metadata may include the amount or frequency of data involving certain parties, subjects, or the like. For instance, a user with a certain number of observed links or interactions with a particular subject may be determined to have a stronger relationship to that subject relative to other users, entities, or subjects. The observable timeline of amount or frequency of interaction data may be altered in order to support the inference of subject matter expertise. For instance, the system may determine that a higher "concentration" of interaction data or metadata in a short timeframe associated with one user indicates a stronger relationship with a particular subject than a second user who simply has a higher amount of interactions over a longer time period. In some embodiments, the amount or frequency data may be displayed as a "heat map" in response to a user query in order to depict multiple identified interactions or metadata and let the querying user determine which relationship is more relevant.

In other embodiments, interaction metadata may include a determination made by the intelligent analysis system 106 based on other knowledge sources. For instance, the intelligent analysis system 106 may receive data from one or more third party systems indicating that a root server associated with a particular email address is related to a certain area of industry or a certain third party entity. In other embodiments, the intelligent analysis system may receive data from one or more platforms such as a social media networking platform, wherein certain interaction data or interaction metadata can be correlated in order to infer further relationships, expected actions, or the like. For instance, an email address included in interaction data may be matched with social media information to determine a job type, role, business team, area of expertise, associated entity, or the like for a specific user of the interaction. By combining this information with frequency and amount of interaction data, the system not only contextualizes relationships in a categorization sense, but also may infer a relative strength or closeness of a relationship between one or more users based on user behavior as indicated by the interaction metadata.

As shown in block 304, the process includes analyzing the interaction data and interaction metadata to determine one or more subjects of interaction and one or more parties of interaction. In some embodiments, the parties included in an interaction may be apparent from certain information included in the interaction data. For instance, the calendaring data, email data, or the like may include the names of the parties involved in the interaction. In further embodiments, the intelligent analysis system 106 may require additional data in order to determine party information, such as data from entity systems (e.g., entity employee contact information database, internet directory, or the like), data from third party systems (e.g., social media information, public data records, or the like), or interaction metadata. As described, the interaction metadata may include information about the interaction data itself. For instance, in the case of a calendaring invitation, the root server identified as being associated with an email address included in the calendaring invite may provide context as to which company a particular user works for.

As shown in block 304, the intelligent analysis system also determines one or more subjects of interactions. For example, in some embodiments, the subject may be determined by a simple subject field included in the interaction data (e.g., email subject, meeting topic, or the like). In other embodiments, the subject may be determined or further narrowed down based on contextual information from the interaction metadata as described previously (e.g., using disparate data types and interaction metadata to infer relation between parties, subjects, or the like). In other embodiments, the system may employ the use of the learning engine 146 to analyze the natural language of the invitation, the intelligent analysis system 106 may determine that "follow up" not only implies the parties have met before, but that the invitation may be related to one or more past interactions between the identified parties. The system may refer back to previously stored interaction data to infer which interaction data may be relevant to identifying the subject of the follow up meeting (e.g., the system may identify interactions within a specific timeframe in the past as relevant, or may rank previous interactions as potentially relevant relative to one another based on the time since the previous interactions occurred). In some embodiments, the system may contextualize the interaction based on other information. For example, in one embodiment, the system may identify that the parties of the interaction recently connected on a social media networking platform, and that the job title of one or more parties involved is related to job recruiting, hiring, human resources, or the like. This data may be combined to infer that one or more parties of the interaction may be seeking relocation or job change in the near future.

In addition, one or more interactions identified between the same or similar parties related to the same or similar subject may be weighted more heavily, as shown in block 306, wherein the system may generate a weighted score. The weighted score may be generated in one of multiple ways. For example, in some embodiments, the weighted score may rank the strength of the relationship between multiple parties. In other embodiments, the system may generate the weighted score for a party and a subject (e.g., user 1 is in a $90^{th}$ percentile category for subject 1 relative to other identified parties based on frequency and amount of interaction data and interaction metadata). In some embodiments, the weighted score may be percentile rank of strength of relationship relative to other identified parties. In other embodiments, there may be predetermined threshold of frequency or amount of interactions, metadata, time between interactions, or the like that can be used to generate the weighted score indicating that a specific party has a relationship to a given subject or other party (e.g., another user, an entity, a working group, or the like). As shown in block 308, the resulting data, after the weighted score has been generated, can be used to construct a graph database wherein parties and subjects are arranged based on the weighted score between them. This graph database can later be accessed by users of the intelligent analysis system 106 in order to query for information related to specific parties or subjects.

For instance, the user may be interested to know what other users in their organization or established contacts outside their organization can offer expert advice on a specific subject. The user can submit the query to the intelligent analysis system 106 to determine if there are any identified relationships that may be relevant. In cases where there are not any previously identified relevant relationships, the system may perform additional analysis on received data or reprogram to specifically analyze newly received data in order to search for interaction data and interaction metadata that may provide insight on newly identified relevant relationships to the user's query.

Moving on to FIG. 4, this Figure illustrates a high-level process flow 400 for user information query, in accordance with embodiments of the present invention. As shown, the process begins at block 402 wherein the user submits a user query via a user device which is received from the user device at the system. In some embodiments, the user query may contain a particular subject for which the user would like to request relevant contacts or associated parties. In some embodiments, the user device may display a predefined form, search field, or other graphical user interface via the user application as dictated by the intelligent analysis system 106 that the user may utilize to enter search terms for the user query. For instance, the user may be interested in searching for employees within their own organization that have been identified as related to or associated with a particular subject (e.g., a particular coding language, or the like). In other embodiments, the user may want to know what parties or outside vendors that the user's organization has had previous contact with that may offer expertise on a specific subject. In this way, the user may leverage the data available in the intelligent analysis system 106 in order to quickly identify existing relationships within the user's organization or close existing contacts familiar with their organization that may have expertise in a certain subject or have a strong relationship with the subject matter as evidenced by their interaction data and interaction metadata. It is understood that "expertise" may not necessarily be strictly defined by a specific level of proficiency, but rather is a term of art to used herein to indicate certain parties which the system has inferred maintain a strong relation to a particular subject matter as evidenced by the determined weighted score.

Once the user query has been received by the system, the process moves on to block 404, wherein the system performs a check of a stored database of analyzed information. This is done in order to determine relevant data to the specific subject of the user query, as shown in block 405. In this way, the system may identify one or more parties that have been determined as being associated with the particular subject matter that the user query is directed to based on the determined weighted score (e.g., party 1 has a $90^{th}$ percentile weighted score as related to the particular subject of the user query relative to other users in the organization, and thus is ranked highly within the organization as a potentially helpful contact on the subject matter).

In some embodiments, the system may make a determination that a party within the organization has a high degree of association with a particular subject matter as evidenced by interaction data, but may also note that the party routinely contacts or meets with other parties, entities, or organizations with reference to the particular subject. In this instance, the system may compile this data in order to rank and categorize the parties as first degree contacts, second degree contacts, or the like based on the relationship of the parties to the user's organization. For instance, parties may be ranked as first degree parties if they are within the user's organization, second degree parties if they have contacted coworkers of the user, social media contacts of the user, or the like.

In instances where the system has determined a party as relevant based solely external interaction metadata, the system may label the party as third degree, unaffiliated, or the like in order to convey that there is no known working relationship between the user's organization and the relevant party, but still noting the party as relevant to the subject of the user query. In this way, the system not only provides helpful identification of relevant parties, but also provides helpful information to the user in terms of how to potentially reach out to the one or more identified relevant parties (e.g., the user may reach out to a second degree party by referencing their first degree party coworker as an introduction, while reaching out to a third degree or unaffiliated party may require a more in depth introduction in terms of background detail). As shown in block 406, and as discussed above, the system may fail to identify relevant parties and thus perform later analysis of received interaction data and interaction metadata in order to attempt to identify relevant parties or interactions in the future. In this instance, in some embodiments, the system may response to the user with a message that there have been no parties identified at this time, but that the user will be notified automatically if any relevant relationships are identified in the future.

Finally, as shown in block 408, the system may compile relevant party information and contact information, if available, and transmit this data to the user device for display to the user (e.g., data may be transmitted in one or more of the multiple communication channels described herein, such as via email, via text message, via user application, via web portal, via API data call and response, or the like). In some embodiments where multiple relevant parties are identified, the user may receive a ranked list of relevant contacts in order of determined relevance based on their weighted score to the subject of the user query. In other embodiments, the relevant party information may be categorized based on hierarchy or party affiliation to the organization of the user (e.g., first degree contacts such as coworkers, second degree contacts such as clients or business partners of the user's organization, and third degree or unaffiliated contacts, or the like).

In some embodiments, the system may also be used to enforce internal policy governance. In this way, the system is not only a tool for collaboration, but a tool for entities to influence the way sensitive information is shared, disseminated, protected, or the like within the entity. In some embodiments, the system may be utilized to assist with estimating the impact of restrictions, security issues, and the like by quickly identifying parties within an organization related to a particular subject. In other embodiments where an administrative body is drafting a new policy, the system may be used as a tool to identify experts on a particular subject, or those likely to be affected by the new policy. Likewise, if a new security issue is identified, the system may be used to quickly identified those needed to remedy the issue or may have been affected by the issue.

In other embodiments, a governance application may relate to the screening of information for certain groups of users. For instance, contact information for the relevant parties may only be provided to the user for first degree contacts, or according to some other policy as set by the entity in control of the intelligent analysis system 106. In some embodiments, administrators may configure the system to only share contact information for the user's coworkers. In embodiments where a second degree party has been identified, the system may suggest reaching out to an identified first degree contact for an introduction to the second degree party and request their specific contact information. In this way, information about relevant parties may be shared in such a way as to continue to foster existing business relationships and protect privacy to the extent that the administrative policy or other regulation may dictate. It is understood that while the intelligent analysis system may share identified relevance between certain subject matter and certain parties, the specific interaction data and interaction metadata is not shared in response to user query, and is generally not designed to be visible to any user except for administrative users in order to protect the privacy of the interactions themselves. In some embodiments, the full interaction data may not be viewable by even administrative users based on certain data access and sharing policies as set by the entity in control of the intelligent analysis system.

FIG. 5 illustrates multiple user interface embodiments for multi-modal information query, in accordance with embodiments of the present invention. As shown in FIG. 5, the system may be configured for different "modes" of information query, as indicated by interface 501 and interface 502, which are shown as embodiments for a "user search" and an "entity search," respectively.

For instance, when using the embodiment shown in interface 501, the user may initiate a query by a person's name in order to find the subjects and parties the system has determined that the person has some relation based on analysis of interaction data and metadata. As shown in interface 501, the user may select the "mode" in the upper left corner to "Search for: User". In this way, the user may then type in a person's name, title, email, identifying information, or the like into the search box shown toward the middle of the interface 501, and receive a drop down of information to verify that the system as located the correct person. In some embodiments, the interface may show these or other results for multiple identified users that match the information provided in the search box. The user may then initiate the query by clicking the "Search" button located at the bottom of the interface 501.

In another embodiment, when using the embodiment shown in interface 502, the user may initiate a query by an entity name, domain name, or the like in order to find the subjects and parties the system has determined that the entity has some relation to, based on analysis of interaction data and metadata. As shown in interface 502, the user may select the "mode" in the upper left corner to "Search for: Entity". In this way, the user may then type in a company or organization name, domain, or the like into the search box shown toward the middle of the interface 502, and receive a drop down of information to verify that the system as located the correct entity. In some embodiments, the interface may show these or other results for multiple identified entities that match the information provided in the search box. The user may then initiate the query by clicking the "Search" button located at the bottom of the interface 502.

FIG. 6 illustrates a user interface for information query results and heat map indication, in accordance with embodiments of the present invention. The particular interface shown in FIG. 6 relates to the results of a "user search" mode query, wherein the subject of the query is a particular person, but it is understood that this depicted is provided as an exemplary embodiment of the type and manner of information that may be displayed in response to a user query of the system 106, and that other modes of user query are possible. As shown in the interface 601, the information displayed may consist of multiple categories of information related to the results identified as relevant to a searched user. The interface 601 generally consists of a list of those who the system has determined as having some relation to the searched user, either based on interaction data or metadata analysis. In some embodiments, the system may display the names and information for multiple users in the bottom portion of the interface 601 as a ranked list based on weighted score of the relationship between the searched user and the users in the list (i.e., a party-party relationship). Along with displaying contact names, the embodiment shown in interface 601 may also show schedule, entity, meeting count, most recent interaction, and recent contact information for each identified user that has an identified relationship with the searched user.

Also shown in interface 601, at the upper portion of the interface, is a heat map showing specific dates on a calendar where interactions have been identified. By clicking a month on the heat map, the user may be presented with a pop-out interface 602 which shows a more granular view of identified interactions. The heat map on interface 601 may include a colorized scale, as shown beneath the "Month 1" calendar entry, indicating a colorized indication of interaction density on each day of each month (e.g., a darker shade may indicate more interaction density or metadata indicators for a particular day, or the like). In this particular embodiment, the user may click on "Month 1" in order to access the pop-out interface 602, which indicates the number of interactions on each day using a dot matrix. The dot matrix may indicate different information depending on the embodiment of the invention. For instance, in some cases, 1 dot may equate to one interaction, while in other embodiments, 1 dot may equate to any number of interactions with a unique user (e.g., 2 dots would indicate interactions with 2 other users, while the number of interactions may be larger). The user may further interact with the pop-out interface 602 in order to further drill down on information about a particular day. In some embodiments, the user information displayed on the bottom portion of interface 601 may dynamically alter based on the user's interfacing with the pop-out interface 602 (e.g., interface 602 is overlaid above the interface 601). In this way, the users identified as having interactions with the searched user for a particular day may be highlighted in the bottom portion of interface 601, or users that did not interact with the searched user on that day may disappear from view in the bottom portion of interface 601.

As shown in the bottom portion of interface 601, each person identified as having some relation or connection to the searched user (e.g., a party-party relationship) is displayed in a list that contains additional information. In this way, the user may view a list of names, schedules (e.g., clickable calendar links that may redirect the user to a calendar view of interacts specific to that user), entity that the user is identified as associated with (e.g., the user's employer), meeting count (e.g., number of times the user has interacted with the searched user), most recent interaction with the searched user, recent contact information (e.g., email, phone number, or the like). It is understood that this information may differ based on the mode of the query initiated by the user. For instance, while the exemplary embodiment in FIG. 6 shows a list of people identified as having party-party relationship with the searched user, in some embodiments the mode of the query may be focused differently. For instance, in FIG. 6, the query is directed to relationships with the searched user, whereas another query may be directed to relationships with a searched entity, subject, or the like. In an embodiment where a user conducts an entity search, the list of users may include a list of users from that entity and their interactions with the user's organization, or the like.

FIG. 7 illustrates an embodiments for keyword information query, in accordance with embodiments of the present invention. In this embodiment, the user may initiate a query based on some keyword, as indicated by the search mode in the upper left corner of interface 701. In the embodiment shown in FIG. 7, the keyword may be a subject such as "cybersecurity," as shown in the search box of interface 701. In some embodiments, the system may intelligently identify related categories, subjects, or keywords that the user may want to query instead or in addition. This may involve using interaction data or metadata in the system's stored records as described with regard to FIG. 3 such that the system may identify subjects associated with the keyword entered by the user.

It is understood that the results of the keyword query may further differ from the results showed in the embodiment shown in FIG. 6. For instance, instead of identifying a list of people or parties that are associated with a searched user, the system will instead analyze available interaction data, metadata, and third party data in order to identify parties and entities associated with the searched keyword. In the same way the system may display a heatmap of interactions between parties, the system may also show a heatmap between users and particular subjects. In this way, the system may display a calendar view of interactions and metadata identified as being related to the particular subject such that the user who initiated the query may identify interactions and associated users who are interacting with the subject of their search.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automated and intelligent analysis of information, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
      receive interaction data and interaction metadata from one or more user devices or one or more third party systems;
      analyze the interaction data and the interaction metadata and determine one or more subjects of interaction and one or more parties of interaction;
      generate a weighted score for the one or more parties of interaction or for the one or more parties of interaction and the one or more subjects of interaction based on analyzing the interaction data and the interaction metadata; and
      store the one or more identified subjects of interaction and one or more parties of interaction in a database, wherein the one or more subjects of interaction and one or more parties of interaction are arranged based on the weighted score;
      receive a user query from the one or more user devices, wherein the user query comprises a specified subject;
      perform a check of the database to determine one or more parties of interaction associated with the specified subject, wherein association is determined based on the weighted score;
      compile a list of relevant parties of interaction as relevant party information;
      transmit the relevant party information to the user, via a graphical user interface of a user device, in response to the user query as heat map data formatted to display on the one or more user devices, wherein the heat map data comprises a colorized indication of interaction density on one or more time periods in a given month; and
      display a table, via the graphical user interface of the user device, beneath the heat map data comprising information including one or more party names, and for each of the party names, associated entities, meeting counts, most recent meeting date, and a most recent contact.

2. The system of claim 1, wherein the interaction data comprises one or more communications between multiple of the parties of interaction.

3. The system of claim 1, wherein the interaction metadata comprises one or more application logs, distribution groups, organizational hierarchy charts, contracts, or governance policies.

4. The system of claim 1, wherein the relevance of the interaction metadata may be determined based on a frequency, amount, timeframe, source, or resource value of an existing business relationship between one or more users or organizations.

5. The system of claim 1, wherein the system is further configured to:
   gather public third party information for the one or more subjects of interaction or one or more parties of interaction; and
   integrate the public third party information as contextual information to support or refute the weighted score.

6. The system of claim 1, wherein the weighted score is a percentile rank for the one or more parties of interaction with regard to association with the one or more subject of interaction as compared within a single organization.

7. A computer program product for automated and intelligent analysis of information, the computer program product comprising at least one non-transitory computer-readable medium having computer-readable program code portions embodied therein, the computer-readable program code portions comprising:
   an executable portion configured for receiving interaction data and interaction metadata from one or more user devices or one or more third party systems;
   an executable portion configured for analyze the interaction data and the interaction metadata and determine one or more subjects of interaction and one or more parties of interaction;
   an executable portion configured for generating a weighted score for the one or more parties of interaction or for the one or more parties of interaction and the one or more subjects of interaction based on analyzing the interaction data and the interaction metadata; and an executable portion configured for storing the one or more identified subjects of interaction and one or more parties of interaction in a database, wherein the one or more subjects of interaction and one or more parties of interaction are arranged based on the weighted score;

an executable portion configured for receiving a user query from the one or more user devices, wherein the user query comprises a specified subject;

an executable portion configured for performing a check of the database to determine one or more parties of interaction associated with the specified subject, wherein association is determined based on the weighted score;

an executable portion configured for compiling a list of relevant parties of interaction as relevant party information;

an executable portion configured for transmitting the relevant party information to the user, via a graphical user interface of the user device, in response to the user query as heat map data formatted to display on the one or more user devices, wherein the heat map data comprises a colorized indication of interaction density on one or more time periods in a given month; and an executable portion configured for displaying a table, via the graphical user interface of the user device, beneath the heat map data comprising information including one or more party names, and for each of the party names, associated entities, meeting counts, most recent meeting date, and a most recent contact.

8. The computer program product of claim 7, wherein the interaction data comprises one or more communications between multiple of the parties of interaction.

9. The computer program product of claim 7, wherein the interaction metadata comprises one or more application logs, distribution groups, organizational hierarchy charts, contracts, or governance policies.

10. The computer program product of claim 7, wherein the relevance of the interaction metadata may be determined based on a frequency, amount, timeframe, source, or resource value of an existing business relationship between one or more users or organizations.

11. The computer program product of claim 7, the computer program product further comprising a non-transitory computer-readable storage medium having computer-executable instructions to:
gather public third party information for the one or more subjects of interaction or one or more parties of interaction; and
integrate the public third party information as contextual information to support or refute the weighted score.

12. The computer program product of claim 7, wherein the weighted score is a percentile rank for the one or more parties of interaction with regard to association with the one or more subjects of interaction as compared within a single organization.

13. A computer implemented method for automated and intelligent analysis of information, the computer implemented method comprising:
providing a computing system comprising a computer processing device and a non-transitory computer readable medium, where the non-transitory computer readable medium comprises configured computer program instruction code, such that when said instruction code is operated by said computer processing device, said computer processing device performs the following operations:
receiving interaction data and interaction metadata from one or more user devices or one or more third party systems;
analyzing the interaction data and the interaction metadata and determine one or more subjects of interaction and one or more parties of interaction;
generating a weighted score for the one or more parties of interaction or for the one or more parties of interaction and the one or more subjects of interaction based on analyzing the interaction data and the interaction metadata; and
storing the one or more identified subjects of interaction and one or more parties of interaction in a database, wherein the one or more subjects of interaction and one or more parties of interaction are arranged based on the weighted score;
receiving a user query from the one or more user devices, wherein the user query comprises a specified subject;
performing a check of the database to determine one or more parties of interaction associated with the specified subject, wherein association is determined based on the weighted score;
compiling a list of relevant parties of interaction as relevant party information;
transmitting the relevant party information to the user, via a graphical user interface of the user device, in response to the user query as heat map data formatted to display on the one or more user devices, wherein the heat map data comprises a colorized indication of interaction density on one or more time periods in a given month; and
displaying, via the graphical user interface of the user device, a table beneath the heat map data comprising information including one or more party names, and for each of the party names, associated entities, meeting counts, most recent meeting date, and a most recent contact.

14. The computer implemented method of claim 13, wherein the interaction data comprises one or more communications between multiple of the parties of interaction.

15. The computer implemented method of claim 13, wherein the interaction metadata comprises one or more application logs, distribution groups, organizational hierarchy charts, contracts, or governance policies.

16. The computer implemented method of claim 13, wherein the relevance of the interaction metadata may be determined based on a frequency, amount, timeframe, source, or resource value of an existing business relationship between one or more users or organizations.

17. The computer implemented method of claim 13, wherein the system is further configured to:
gather public third party information for the one or more subjects of interaction or one or more parties of interaction; and
integrate the public third party information as contextual information to support or refute the weighted score.

* * * * *